(12) United States Patent
Verma et al.

(10) Patent No.: US 8,474,023 B2
(45) Date of Patent: Jun. 25, 2013

(54) PROACTIVE CREDENTIAL CACHING

(75) Inventors: Vineet Verma, Fremont, CA (US); Sudheer Poorna Chandra Matta, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1088 days.

(21) Appl. No.: 12/131,028

(22) Filed: May 30, 2008

(65) Prior Publication Data

US 2009/0300740 A1 Dec. 3, 2009

(51) Int. Cl.
*G06F 7/04* (2006.01)

(52) U.S. Cl.
USPC .................................. 726/6; 726/18; 726/19

(58) Field of Classification Search
USPC ................................................ 726/6, 18, 19
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | de Couasnon et al. |
| 4,176,316 A | 11/1979 | DeRosa et al. |
| 4,247,908 A | 1/1981 | Lockhart, Jr. et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah et al. |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad et al. |
| 4,673,805 A | 6/1987 | Shepard et al. |

(Continued)

FOREIGN PATENT DOCUMENTS

| | | |
|---|---|---|
| WO | WO-9403986 | 2/1994 |
| WO | WO-9911003 | 3/1999 |

(Continued)

OTHER PUBLICATIONS

Co-pending U.S. Appl. No. 10/778,901, filed Feb. 13, 2004.

(Continued)

*Primary Examiner* — Teshome Hailu
(74) *Attorney, Agent, or Firm* — Harrity & Harrity, LLP (57) ABSTRACT

In wireless networking, such as per the IEEE 802.11 standard, a technique automatically republishes an authentication credential to a global credential repository. A station can have a first credential, as is created when the station connects to a first access node of a wireless network. Upon trying and failing to connect to a second access node of the wireless network, the station can have a second credential created and published to the global credential repository. In some situations, the station then roams back to the first access node using the first credential. Efficiently, when the station uses the first credential at the first access node, the first credential can be automatically republished as a global credential. The automatic republishing of the first credential can ensure that the station is able to access the wireless network via various access nodes when roaming.

16 Claims, 7 Drawing Sheets

U.S. PATENT DOCUMENTS

| | | |
|---|---|---|
| 4,707,839 A | 11/1987 | Andren et al. |
| 4,730,340 A | 3/1988 | Frazier, Jr. |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener, Sr. et al. |
| 4,850,009 A | 7/1989 | Zook et al. |
| 4,872,182 A | 10/1989 | McRae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Lim |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten et al. |
| 5,339,316 A | 8/1994 | Diepstraten |
| 5,371,783 A | 12/1994 | Rose et al. |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund et al. |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney, II et al. |
| 5,649,289 A | 7/1997 | Wang et al. |
| 5,668,803 A | 9/1997 | Tymes et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown et al. |
| 6,041,240 A | 3/2000 | McCarthy et al. |
| 6,078,568 A | 6/2000 | Wright et al. |
| 6,088,591 A | 7/2000 | Trompower et al. |
| 6,101,539 A | 8/2000 | Kennelly et al. |
| 6,118,771 A | 9/2000 | Tajika et al. |
| 6,119,009 A | 9/2000 | Baranger et al. |
| 6,160,804 A | 12/2000 | Ahmed et al. |
| 6,188,649 B1 | 2/2001 | Birukawa et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright et al. |
| 6,256,300 B1 | 7/2001 | Ahmed et al. |
| 6,256,334 B1 | 7/2001 | Adachi |
| 6,262,988 B1 | 7/2001 | Vig |
| 6,285,662 B1 | 9/2001 | Watanabe et al. |
| 6,304,596 B1 | 10/2001 | Yamano et al. |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 | 7/2003 | Ala-Laurila et al. |
| 6,614,787 B1 | 9/2003 | Jain et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,661,787 B1 | 12/2003 | O'Connell et al. |
| 6,687,498 B2 | 2/2004 | McKenna et al. |
| 6,697,415 B1 | 2/2004 | Mahany |
| 6,725,260 B1 | 4/2004 | Philyaw |
| 6,747,961 B1 | 6/2004 | Ahmed et al. |
| 6,760,324 B1 | 7/2004 | Scott et al. |
| 6,839,338 B1 | 1/2005 | Amara et al. |
| 6,839,348 B2 | 1/2005 | Tang et al. |
| 6,879,812 B2 | 4/2005 | Agrawal et al. |
| 6,957,067 B1 | 10/2005 | Iyer et al. |
| 6,973,622 B1 | 12/2005 | Rappaport et al. |
| 6,978,301 B2 | 12/2005 | Tindal |
| 7,020,438 B2 | 3/2006 | Sinivaara et al. |
| 7,020,773 B1 | 3/2006 | Otway et al. |
| 7,024,394 B1 | 4/2006 | Ashour et al. |
| 7,062,566 B2 | 6/2006 | Amara et al. |
| 7,068,999 B2 | 6/2006 | Ballai |
| 7,110,756 B2 | 9/2006 | Diener |
| 7,116,979 B2 | 10/2006 | Backes et al. |
| 7,146,166 B2 | 12/2006 | Backes et al. |
| 7,155,518 B2 | 12/2006 | Forslow et al. |
| 7,221,927 B2 | 5/2007 | Kolar et al. |
| 7,224,970 B2 | 5/2007 | Smith et al. |
| 7,263,366 B2 | 8/2007 | Miyashita |
| 7,280,495 B1 | 10/2007 | Zweig et al. |
| 7,317,914 B2 | 1/2008 | Adya et al. |
| 7,324,468 B2 | 1/2008 | Fischer |
| 7,324,487 B2 | 1/2008 | Saito |
| 7,359,676 B2 | 4/2008 | Hrastar |
| 7,370,362 B2 | 5/2008 | Olson et al. |
| 7,376,080 B1 | 5/2008 | Riddle et al. |
| 7,421,248 B1 | 9/2008 | Laux et al. |
| 7,466,678 B2 | 12/2008 | Cromer et al. |
| 7,469,341 B2 * | 12/2008 | Edgett et al. .................. 713/176 |
| 7,489,648 B2 | 2/2009 | Griswold |
| 7,509,096 B2 | 3/2009 | Palm et al. |
| 7,529,925 B2 | 5/2009 | Harkins |
| 7,551,619 B2 | 6/2009 | Tiwari |
| 7,573,859 B2 | 8/2009 | Taylor |
| 7,577,453 B2 | 8/2009 | Matta |
| 7,793,104 B2 * | 9/2010 | Zheng et al. .................. 380/247 |
| 7,921,290 B2 * | 4/2011 | Albert et al. .................. 713/168 |
| 2001/0024953 A1 | 9/2001 | Balogh |
| 2002/0052205 A1 | 5/2002 | Belostofsky et al. |
| 2002/0060995 A1 | 5/2002 | Cervello et al. |
| 2002/0069278 A1 | 6/2002 | Forslow |
| 2002/0095486 A1 | 7/2002 | Bahl |
| 2002/0101868 A1 | 8/2002 | Clear et al. |

| | | | |
|---|---|---|---|
| 2002/0176437 A1 | 11/2002 | Busch et al. | |
| 2002/0191572 A1* | 12/2002 | Weinstein et al. | 370/338 |
| 2003/0014646 A1 | 1/2003 | Buddhikot et al. | |
| 2003/0018889 A1 | 1/2003 | Burnett et al. | |
| 2003/0055959 A1 | 3/2003 | Sato | |
| 2003/0107590 A1 | 6/2003 | Levillain et al. | |
| 2003/0134642 A1 | 7/2003 | Kostic et al. | |
| 2003/0135762 A1 | 7/2003 | Macaulay | |
| 2003/0174706 A1 | 9/2003 | Shankar et al. | |
| 2003/0227934 A1 | 12/2003 | White et al. | |
| 2004/0003285 A1 | 1/2004 | Whelan et al. | |
| 2004/0019857 A1 | 1/2004 | Teig et al. | |
| 2004/0025044 A1 | 2/2004 | Day | |
| 2004/0047320 A1 | 3/2004 | Eglin | |
| 2004/0053632 A1 | 3/2004 | Nikkelen et al. | |
| 2004/0062267 A1 | 4/2004 | Minami et al. | |
| 2004/0064560 A1 | 4/2004 | Zhang et al. | |
| 2004/0068668 A1 | 4/2004 | Lor et al. | |
| 2004/0095914 A1 | 5/2004 | Katsube et al. | |
| 2004/0095932 A1 | 5/2004 | Astarabadi et al. | |
| 2004/0120370 A1 | 6/2004 | Lupo | |
| 2004/0143428 A1 | 7/2004 | Rappaport et al. | |
| 2004/0165545 A1 | 8/2004 | Cook | |
| 2004/0208570 A1 | 10/2004 | Reader | |
| 2004/0221042 A1 | 11/2004 | Meier | |
| 2004/0230370 A1 | 11/2004 | Tzamaloukas | |
| 2004/0236702 A1 | 11/2004 | Fink et al. | |
| 2004/0255167 A1 | 12/2004 | Knight | |
| 2004/0259555 A1 | 12/2004 | Rappaport et al. | |
| 2005/0030929 A1 | 2/2005 | Swier et al. | |
| 2005/0037818 A1 | 2/2005 | Seshadri et al. | |
| 2005/0054326 A1 | 3/2005 | Rogers | |
| 2005/0058132 A1 | 3/2005 | Okano et al. | |
| 2005/0059405 A1 | 3/2005 | Thomson et al. | |
| 2005/0059406 A1 | 3/2005 | Thomson et al. | |
| 2005/0064873 A1 | 3/2005 | Karaoguz et al. | |
| 2005/0068925 A1 | 3/2005 | Palm et al. | |
| 2005/0073980 A1 | 4/2005 | Thomson et al. | |
| 2005/0097618 A1 | 5/2005 | Arling et al. | |
| 2005/0122977 A1 | 6/2005 | Lieberman | |
| 2005/0128989 A1 | 6/2005 | Bhagwat et al. | |
| 2005/0157730 A1 | 7/2005 | Grant et al. | |
| 2005/0180358 A1 | 8/2005 | Kolar et al. | |
| 2005/0181805 A1 | 8/2005 | Gallagher | |
| 2005/0193103 A1 | 9/2005 | Drabik | |
| 2005/0223111 A1 | 10/2005 | Bhandaru et al. | |
| 2005/0239461 A1 | 10/2005 | Verma et al. | |
| 2005/0240665 A1 | 10/2005 | Gu et al. | |
| 2005/0245269 A1 | 11/2005 | Demirhan et al. | |
| 2005/0259597 A1 | 11/2005 | Benedetto et al. | |
| 2005/0273442 A1 | 12/2005 | Bennett et al. | |
| 2005/0276218 A1 | 12/2005 | Ooghe et al. | |
| 2006/0045050 A1 | 3/2006 | Floros et al. | |
| 2006/0104224 A1 | 5/2006 | Singh et al. | |
| 2006/0128415 A1 | 6/2006 | Horikoshi et al. | |
| 2006/0161983 A1 | 7/2006 | Cothrell et al. | |
| 2006/0174336 A1 | 8/2006 | Chen | |
| 2006/0189311 A1 | 8/2006 | Cromer et al. | |
| 2006/0200862 A1 | 9/2006 | Olson et al. | |
| 2006/0245393 A1 | 11/2006 | Bajic | |
| 2006/0248331 A1 | 11/2006 | Harkins | |
| 2006/0276192 A1 | 12/2006 | Dutta et al. | |
| 2007/0025265 A1 | 2/2007 | Porras et al. | |
| 2007/0064718 A1 | 3/2007 | Ekl et al. | |
| 2007/0070937 A1 | 3/2007 | Demirhan et al. | |
| 2007/0083924 A1 | 4/2007 | Lu | |
| 2007/0086378 A1 | 4/2007 | Matta et al. | |
| 2007/0091889 A1 | 4/2007 | Xiao et al. | |
| 2007/0189222 A1 | 8/2007 | Kolar et al. | |
| 2007/0260720 A1 | 11/2007 | Morain | |
| 2008/0008117 A1 | 1/2008 | Alizadeh-Shabdiz | |
| 2008/0013481 A1 | 1/2008 | Simons et al. | |
| 2008/0056200 A1 | 3/2008 | Johnson | |
| 2008/0056211 A1 | 3/2008 | Kim et al. | |
| 2008/0065888 A1* | 3/2008 | Zheng et al. | 713/171 |
| 2008/0096575 A1 | 4/2008 | Aragon et al. | |
| 2008/0107077 A1 | 5/2008 | Murphy | |
| 2008/0114784 A1 | 5/2008 | Murphy | |
| 2008/0117822 A1 | 5/2008 | Murphy et al. | |
| 2008/0151844 A1 | 6/2008 | Tiwari | |
| 2008/0162921 A1 | 7/2008 | Chesnutt et al. | |
| 2008/0267407 A1* | 10/2008 | Vanderveen | 380/277 |
| 2009/0006848 A1* | 1/2009 | Adrangi et al. | 713/168 |
| 2009/0031044 A1 | 1/2009 | Barrack et al. | |
| 2009/0103725 A1* | 4/2009 | Tang et al. | 380/45 |
| 2009/0198999 A1 | 8/2009 | Harkins | |

FOREIGN PATENT DOCUMENTS

| | | |
|---|---|---|
| WO | WO-03085544 | 10/2003 |
| WO | WO-2004095192 | 11/2004 |
| WO | WO-2004095800 | 11/2004 |

OTHER PUBLICATIONS

Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,073, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/330,877, filed Jan. 11, 2006.
Co-pending U.S. Appl. No. 11/351,104, filed Feb. 8, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 12/491,201, filed Jun. 24, 2009.
Co-pending U.S. Appl. No. 11/417,830, filed May 3, 2006.
Co-pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 11/604,075, filed Nov. 22, 2006.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 11/975,134, filed Oct. 16, 2007.
Co-pending U.S. Appl. No. 11/966,912, filed Dec. 28, 2007.
Co-pending U.S. Appl. No. 12/489,295, filed Jun. 22, 2009.
Co-pending U.S. Appl. No. 12/336,492, filed Dec. 16, 2008.
Notice of Allowance Mailed Feb. 26, 2007 in Co-pending U.S. Appl. No. 10/778,901, filed Feb. 13, 2004.
Non-Final Office Action Mailed Sep. 22, 2009 in Co-pending U.S. Appl. No. 11/784,307, filed Apr. 5, 2007.
Notice of Allowance Mailed Feb. 27, 2009 in Co-pending U.S. Appl. No. 11/377,859, filed Mar. 15, 2006.
Final Office Action Mailed Aug. 27, 2008 in Co-pending U.S. Appl. No. 11/377,859, filed Mar. 15, 2006.
Non-Final Office Action Mailed Jan. 8, 2008 in Co-pending U.S. Appl. No. 11/377,859, filed Mar. 15, 2006.
Notice of Allowance Mailed Jun. 11, 2009 in Co-pending U.S. Appl. No. 11/326,966, filed Jan. 5, 2006.
Non-Final Office Action Mailed Nov. 10, 2008 in Co-pending U.S. Appl. No. 11/328,966, filed Jan. 5, 2006.
Non-Final Office Action Mailed Aug. 6, 2009 in Co-pending U.S. Appl. No. 11/330,877, filed Jan. 11, 2006.
Final Office Action Mailed Mar. 13, 2009 in Co-pending U.S. Appl. No. 11/330,877, filed Jan. 11, 2006.
Non-Final Office Action Mailed Sep. 11, 2008 in Co-pending U.S. Appl. No. 11/330,877, filed Jan. 11, 2006.
Non-Final Office Action Mailed Dec. 2, 2009 in Co-pending U.S. Appl. No. 11/351,104, filed Feb. 8, 2006.
Final Office Action Mailed Jun. 10, 2009 in Co-pending U.S. Appl. No. 11/351,104, filed Feb. 8, 2006.
Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.
Final Office Action Mailed Oct. 23, 2008 in Co-pending U.S. Appl. No. 11/331,789, filed Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.

Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.
Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/502,891, filed Nov. 3, 2006.
Non-Final Office Action Mailed Jan. 14, 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
Notice of Allowance Mailed Mar. 19, 2010, in Co-pending U.S. Appl. No. 11/487,722, filed Jul. 17, 2006.
International Search Report PCT/US05/004702 dated Aug. 10, 2006, pp. 1-3.
Written Opinion PCT/US05/004702 dated Aug. 10, 2006, pp. 1-5.
International Search Report PCT/US06/09525 dated Sep. 13, 2007, pp. 1-2.
Written Opinion PCT/US06/09525 dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Search Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.
Written Opinion PCT/US07/089134 dated Apr. 10, 2008, pp. 1-4.
Acampa and Winters, IEEE Journal on selected Areas in Communications. SAC-5:796-804 (1987).
Acampora and Winters, IEEE Communications Magazine, 25(8):11-20 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Fortune et al., IEEE Computational Science and Engineering, "Wise Design of Indoor Wireless Systems: Practical Computation and Optimization", p. 58-68 (1995).
Freret et al., Applications of Spread-Spectrum Radio to Wireless Terminal Communications, Conf. Record. Nat'l Telecom. Conf., Nov. 30-Dec. 4, 1980.
Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propogation Model for In-Building Personal Communications Systems", International Journal of Wireless Information Networks, vol. 1, No. 1, 1994.
Kim et al., "Radio Propogation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Users", (1977).
LAN/MAN Standards Committee of the IEEE Computer Society, Part 11:Wireless LAN Medium Access Control (MAC) and Physical Layer (PHY) Specifications: Higher Speed Physical Layer Extension in the 2.4 GHz Band, IEEE Std. 801.11b (1999).
Okamoto and Xu, IEEE, Proceedings of the 13th Annual Hawaii International Conference on System Sciences, pp. 54-63 (1997).
Panjawani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Puttini, R., Percher, J., Me, L., and De Sousa, R. 2004. A fully distributed IDS for Manet. In *Proceedings of the Ninth international Symposium on Computers and Communications 2004 vol. 2 (Iscc"04)*—vol. 02 (Jun. 28-Jul. 1, 2004). ISCC. IEEE Computer Society. Washington. DC. 331-338.
Seidel et al, "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus", IEEE ICUPC '96 Proceedings (1996).
Ullmo et al., "Wireless Propogation in Buildings: A Statistic Scattering Approach", IEEE Transactions on Vehicular Technology, vol. 48, No. 3, May 1999.

* cited by examiner

PROACTIVE CREDENTIAL CACHING

BACKGROUND

To access a wireless local area network (WLAN) securely, a key can be established to encrypt transmissions between a station and a network portal (NP), authenticator, access point (AP), or other network access device, collectively referred to as "access nodes" within this document. When the station connects to the WLAN, the station and an access node associated with the WLAN can then exchange a sequence of four messages known as the "four-way handshake." The four-way handshake produces keys unique to the station that are subsequently used to protect transmissions, such as to guarantee confidentiality, source authentication, and message integrity. One example of such a key is a Pairwise Master Key (PMK).

A station can roam from one access node to another. When passing from a first access node to another a "hand-off" can occur, at which time a station changes connection from the first access node to a second access node.

Generation of keys during hand-off, such as in the four-way handshake, typically takes a relatively small amount of time. However, the time can be enough for a station to "drop off" the network. One example of a time-consuming handoff can occur when a station requires a new key. For example, say a station is using a single PMK in a WLAN, and fails to hand off from a first access node to a second access node using the existing key. This can require the creation of a new key. The time required to handle a change in keys from the first access node to the second access node can be long enough that for a period of time, the station is not connected to the network and cannot send and receive data.

Consider a problem involving multiple PMKs. In a network having multiple access nodes, a first access node can authenticate the station using a first PMK and can create keys for use by the station. This PMK can be published to a global cache shared by all access nodes. When roaming to a second access node, the station can attempt to use keys associated with the first PMK as all access nodes can share access to the global cache. The station can attempt to associate with a second access node and, assuming the attempt fails, the access node can create a second PMK and publish the PMK to the global cache for use by the station in transmitting and receiving data with any access node on the network sharing the global credential repository. This creation of PMKs at each access node can be time-consuming and can hamper performance.

Consider a building having network access on multiple floors. A robot rides an elevator between floors, as a person would, and is handed off from access node to access node, e.g. APs, at each floor that the robot visits. The robot receives instructions via a wireless network. As the robot changes from, for example, floor 1 to floor 2, the robot must re-associate with a new access node to continue to receive instructions. At floor 2 the robot must exit and perform a task. There, the elevator doors open for a brief period of time. A delay in authentication causes the robot to fail to exit the elevator prior to the closing of the doors. The elevator proceeds to the next floor, and the delay in network access has caused the robot to fail to perform at least one of its tasks as the robot did not exit the elevator. The problem can repeat itself at each subsequent floor and the task might never be accomplished. The foregoing example illustrates an actual problem experienced with a hospital robot, and is not intended to limit the scope of claimed subject matter to a specific implementation.

The foregoing examples of the related art and limitations related therewith are intended to be illustrative and not exclusive. Other limitations of the related art will become apparent upon a reading of the specification and a study of the drawings.

SUMMARY

In various examples, one or more of the above-described problems have been reduced or eliminated, while other examples are directed to other improvements. The following examples and aspects thereof are described and illustrated in conjunction with systems, tools, and methods that are meant to be exemplary and illustrative, not limiting in scope.

A technique automatically republishes at least a portion of a first credential when a station roams from access node to access node. The station can use a first credential to connect to a wireless network through a first access node. At least a portion of the first credential can be shared with the network via a global credential repository. When the station roams to a second access node, for one reason or another, the station is unable to connect through the second access node using the global credential repository. However, the station may use a second credential to connect through the second access node, and at least a portion of the second credential can be published to the global credential repository. When the station roams back to the first access node, the station may use the first credential to associate with the first access node. In accordance with the technique, the station can be admitted using the first credential, and the first credential can be automatically republished to the global credential repository replacing the second credential.

Advantageously, the access node connecting the station can allow the station to quickly begin transmitting and receiving data. Time is saved, which can lead to the difference between the station reconnecting or failing to reconnect relatively quickly.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
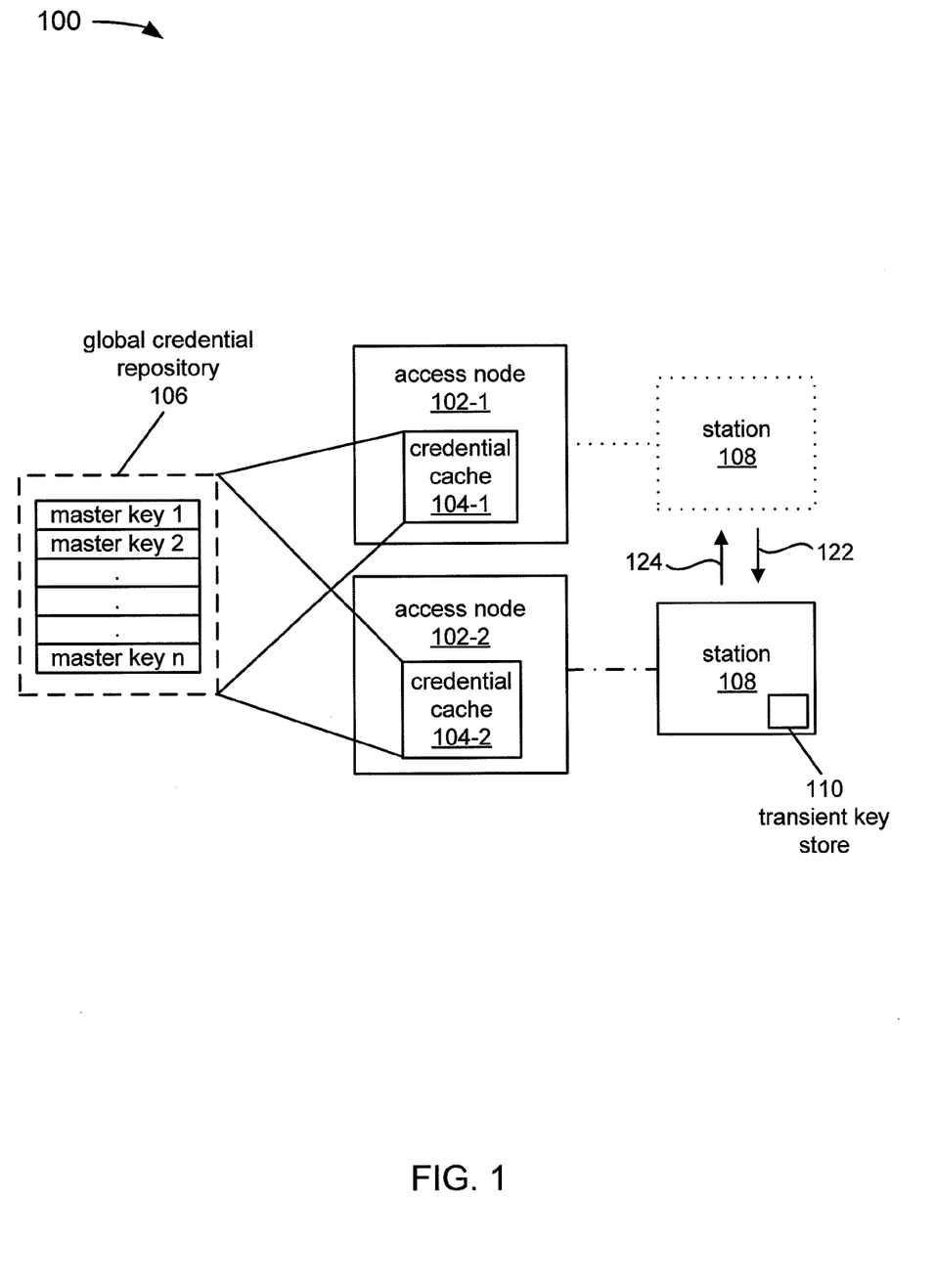
FIG. 1 depicts an example of a system including access nodes that proactively cache credentials.

FIG. 1 depicts an example of a system 100 including access nodes that proactively cache credentials. FIG. 1 includes access nodes 102-1 and 102-2 (collectively access nodes 102), credential caches 104-1 and 104-2 (collectively credential caches 104), a global credential repository 106, a station 108, and a transient key store 110.

In the example of FIG. 1, access nodes 102 can store master keys and generate transient keys for use by a station in communicating with a network. Access nodes 102 can include a network portal (NP), an authenticator (AUTH), an access point (AP), or other known or convenient devices used to associate and/or connect a station to a wireless network. Access nodes 102 may or may not, themselves, be stations, but are not referred to as such so as to avoid confusing the access nodes 102 with the station 108. The access nodes 102 typically include a communications port for communication with one or more stations including the station 108. The access nodes 102 can include one or more radios for wireless transmission to and from the station 108. The access nodes 102 can include known or convenient network interfaces, such as wired interfaces for communication with a wired network, interfaces for communication with a backbone, etc. The access nodes 102 can be coupled to a gateway or router to provide network access to such as via an Internet Service Provider (ISP). A computing system can be specially adapted to serve as an access node.

The credential caches 104 include computer readable mediums on which are stored one or more credentials. As used herein, a computer readable medium is any known or convenient machine, manufacture, and/or composition of matter capable of storing data and/or instructions, at least ephemerally, thereon. A computer readable medium can be coupled to a processor in a known or convenient manner. The credentials can include keys, e.g. a master key such as a pair-wise master key (PMK), a transient key such as a pair-wise transient key (PTK), or some other convenient key; a value derived from a key, such as a hash (or some other) value generated from the key; and/or other data useful to identify, associate, and/or authenticate a station. A credential can include more than a master key and publication of a portion of the credential can be, by way of example and not limitation, of the master key alone. Each of these values, as used herein, is generally referred to as a "key" because a most common implementation will probably, though not necessarily, include a key at least at the access node. For example, in the Institute of Electrical and Electronic Engineers (IEEE) 802.11i context, an encryption scheme includes keys, and the PMK is an example.

The global credential repository 106 represents a set of keys associated with stations used by the access nodes 102 to transmit and receive data with stations allowed to access the network. In a specific implementation, the access nodes 102 are connected to the global credential repository 106 via a secure link. For each allowable station there is an associated key. Within a network including the access nodes 102, each station having a key in the global credential repository 106 can connect to any of access nodes 102 using the key or a value created from the key, such as a PTK.

The station 108 can include any known or convenient wireless device. It should be noted that the station 108 may or may not be completely wireless (or wireless at all), but for illustrative purposes only, the station 108 is assumed to be a wireless device, such as by way of example but not limitation, a cell phone, PDA, laptop, notebook computing device, or any other device that can use 802.11, 3G, Wi-Max and/or another known or convenient wireless protocol. For illustrative purposes, in the example of FIG. 1, the station 108 is coupled to the access node 102-2. However, the station 108 was previously coupled to the access node 102-1. Roaming indicator 122 is intended to show that station 108 previously roamed from access node 102-1. As depicted in FIG. 1, the station 108 is currently associated with access node 102-2. Roaming indicator 124 is intended to show that the station 108 may roam back to access node 102-1.

In a specific implementation, a PMK is used to encode messages transmitted from the station 108 to the access node 102-2, and to decode messages transmitted from the access node 102-2 to the station 108. The PMK is not typically transmitted between the station 108 and the access node 102-2; but the PMK could be used for encryption. However, a PTK or other value generated from the PMK can be used and regularly replaced to ensure that the key is not discovered and that security is not compromised. The key in the global credential repository 106 can include a PMK, a value created from the PMK, a PTK, a session encryption key (SEK), a hash value created from a master key, or any known or convenient value used to secure messages transmitted between the station 108 and the access node 102-2.

The transient key store 110 can include a key. In keeping with the prior statement that non-key values could be used, but a key is believed to be most likely, we assume for illustrative purposes that the transient key store 110 includes keys rather than other values. It should be noted that non-key values may be stored in addition to the key. Although it is possible for the key to be, for example, a master key, the purpose of the transient key store 110 is to keep a transient key. So storing a master key in the transient key store 110, though it would technically work, may be seen as a suboptimal or unusual choice.

The key included in the transient key store 110 can pair with or be stored in the global credential repository 106 for use in connecting the station 108 with the network through the access nodes 102. The key stored in the transient key store 110 can be changed regularly, so that if it is acquired or otherwise compromised, an intruder will not be able to use the key stored in transient key store 110 to breach security. The transient key 110 can be exposed to a network including individuals or programs that might attempt to break the security of the connection between the station 108 and the access node 102-2. However, the master key is generally not exposed.

In the example of FIG. 1 the station 108 is assumed for illustrative purposes to have previously been connected to the network through the access node 102-1. The access node 102-1 had associated a master key with the station 108 and provided any necessary keys to the station 108. The access node 102-1 stored the master key assigned to station 108 in the credential cache 104-1 and published the master key as a global credential to at least one other access node and the credential caches of each other access node reflect the global credential repository 106. Thus, the global credential repository 106 reflects the new master key and the credential caches 104 each reflect the global credential repository 106. It is assumed in the example of FIG. 1 that the station 108 has roamed near the access node 102-2, as is illustrated by the roaming indicator 122.

In the example of FIG. 1, in operation, the station 108 tries, but is unable, for one reason or another, to connect to the network through the access node 102-2 using the master key (henceforth, the "old master key"). In order to connect the station 108, the access node 102-2 creates or acquires a new master key for the station 108. The new master key is stored in the credential cache 104-2 and published. The global credential repository 106 reflects the new master key, and the access node 102-1 stores the new master key in the credential cache 104-1. The access node 102-2 transmits a transient key to the station 108 for storage in the transient key store 110. The station 108 uses the transient key in the transient key store 110 to connect to the network through the access node 102-2.

In the example of FIG. 1, in operation, the station 108 roams back to the access node 102-1 as indicated by the roaming indicator 124. Having previously connected to the network through the access node 102-1, the station 108 may attempt to use the key the station 108 previously used with the access node 102-1. The access node 102-1 recognizes the key, and connects the station 108. The access node 102-1 automatically republishes the old master key as a global credential to the global credential repository 106. In a specific implementation, the access node 102-1 republishes to the global credential repository 106 via a secure link. The access node 102-2 receives the old master key and stores it in the credential cache 104-2 for use in the future.

Figure 2:
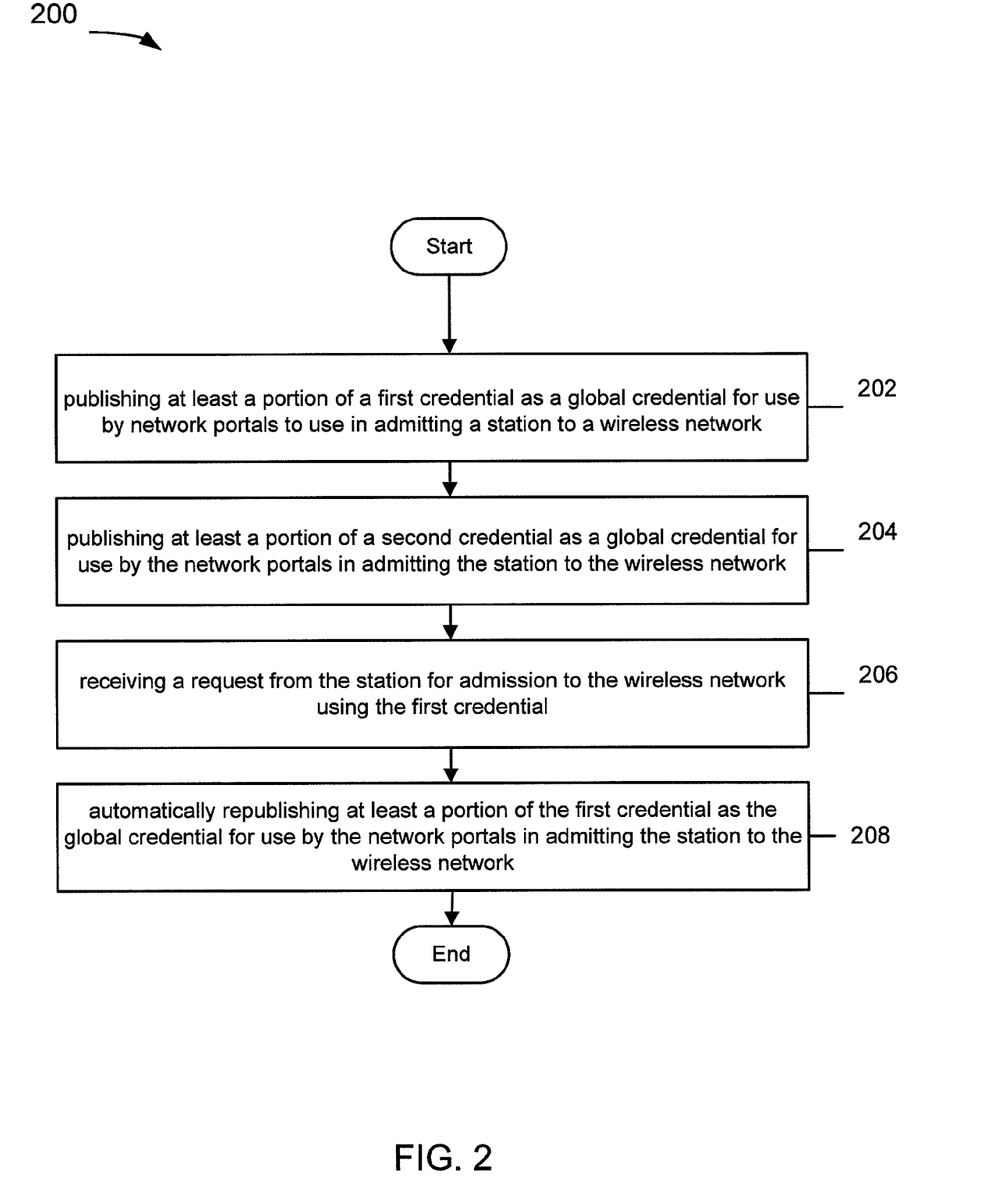
FIG. 2 depicts a flowchart of an example of a method for proactively caching credentials.

FIG. 2 depicts a flowchart 200 of an example of a method for proactively caching credentials. The method is organized as a sequence of modules in the flowchart 200. However, it should be understood that these and other modules associated with other methods described herein may be reordered for parallel execution or into different sequences of modules. One or more of the modules (or portions thereof) may be implemented on a computer readable medium for access and/or execution by a computer.

In the example of FIG. 2, the flowchart 200 starts at module 202 with publishing at least a portion of a first credential as a global credential for use by access nodes to use in connecting a station to a wireless network. As described with reference to the example of FIG. 1, the first credential can include, for example, a PMK, transient key and/or other key or value derived from a master key. While it is possible to publish all values or keys included in a credential, publication of a portion of the credential can entail publication of one or more of the keys or values, but not all. For example, publication could be of a PMK alone.

In the example of FIG. 2, the flowchart 200 continues to module 204 with publishing at least a portion of a second credential as a global credential for use by the access nodes in connecting the station to the wireless network. The second credential could be one created or acquired by an access node that is connecting a roaming station. Notably, the second credential can be acquired after a first credential has already been created and used by the access nodes to communicate with the station. At least a portion of the second credential can then replace at least a portion of the first credential, though it is possible for both the first credential and the second credential to be published concurrently. The second credential can be published to a global credential repository for use by a second access node in connecting the station when the station roams from a first access node to the second access node.

In the example of FIG. 2, the flowchart 200 continues to module 206 with receiving a request from the station for admission to the wireless network using the first credential. The station can roam to an access node through which the station had previously been connected to the wireless network. As such, the station may automatically use the previous key, and the access node can associate the station using the key.

In the example of FIG. 2, the flowchart 200 continues to module 208 with automatically republishing at least a portion of the first credential as the global credential for use by the access nodes in connecting the station to the wireless network. The portion of the key republished can refer to a master key where the credential includes a master key as well as a transient key or other key or value generated from the master key. An access node using the first credential to connect the station can admit the station as discussed above, and automatically republish the key. Other access nodes can then use the credential to connect (or maintain the connection of) the station to the wireless network when the station roams. A significance of automatically republishing is that an access node does not have to recreate a key; it can simply republish the relevant credential. Having automatically republished at least a portion of the first credential as the global credential, the flowchart 200 ends. It should be noted that the flowchart 200 ends only because its illustrative value would diminish with additional (possibly redundant) modules.

Figure 3:
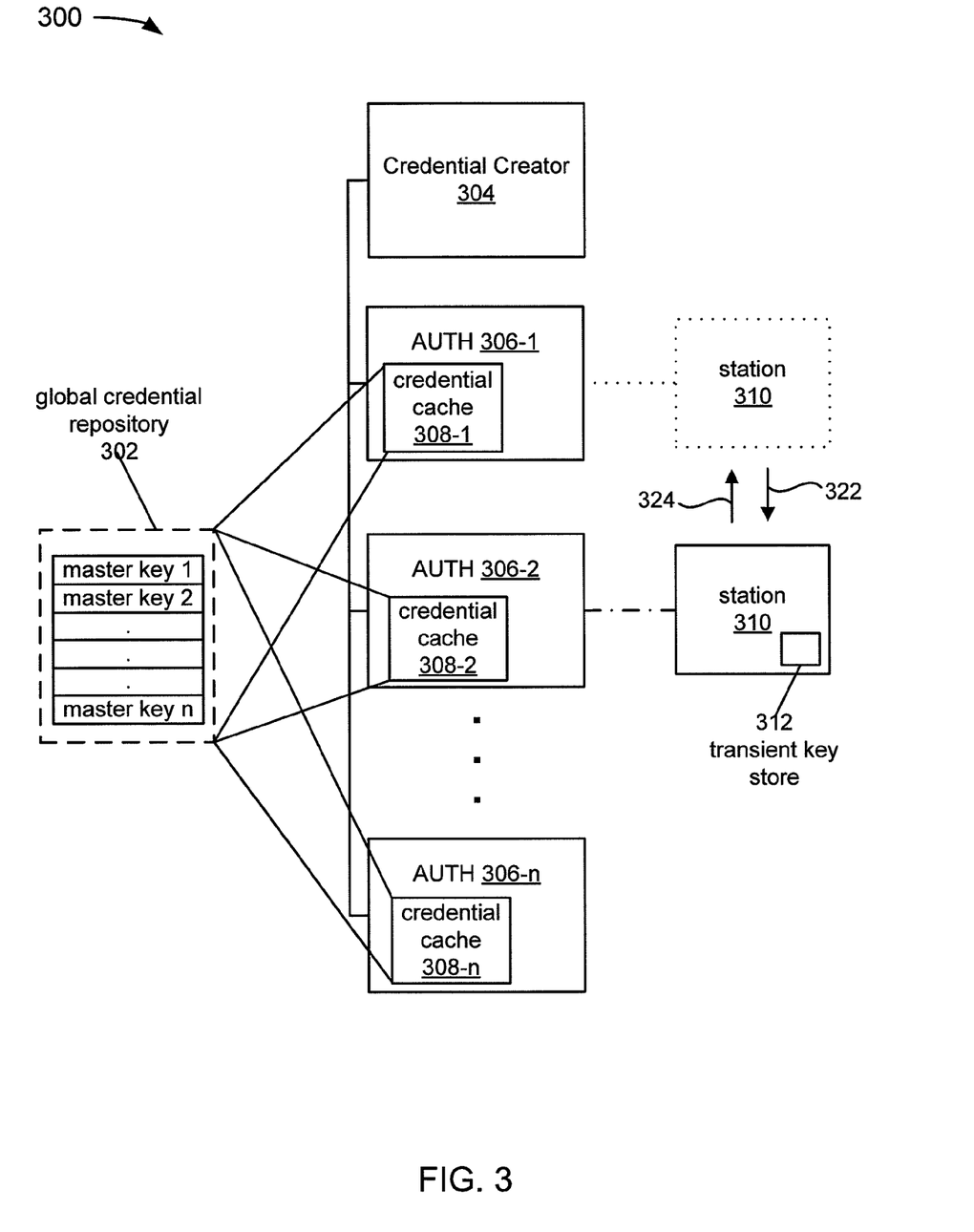
FIG. 3 depicts an example of a system of authenticators proactively caching credentials.

FIG. 3 depicts an example of a system 300 of AUTHs proactively caching a credential. FIG. 3 includes a global credential repository 302, a credential creator 304, an AUTH 306-1 to an AUTH 306-n (collectively, the AUTHs 306), a credential cache 308-1 to a credential cache 308-n (collectively, the credential caches 308) on respective AUTHs 306, a station 310, and a transient key store 312. Although the term AUTH is used in the 802.11 standard, the use here is not intended to necessarily limit the example of FIG. 3 to an 802.11 implementation.

In the example of FIG. 3, the global credential repository 302 includes a set of keys. Each key can be associated with a station and used by the AUTHs 306 to connect stations to the network. Within a network including the AUTHs 306, each station having a key in the global credential repository 302 can connect to any of AUTHs 306 using the key or a key created from the key, such as a transient key. It should be noted that there may or may not actually be an independent copy of the global credential repository 302 stored in a computer readable medium. Rather, the global credential repository 302 could be a logical construct that is distributed across the credential caches 308.

In the example of FIG. 3, the credential creator 304 can be a computing system including a database, data store, list of records, or other known or convenient storage medium coupled to the AUTHs 306. The credential creator can include authentication and authorization logic for creating credentials on behalf of stations. The credential creator 304 can store credentials for use by the AUTHS 306. In a non-limiting example, the credential creator 304 could include a Remote Authentication Dial-In User Service (RADIUS) server.

In the example of FIG. 3, the AUTHs 306 include hardware units acting as communication nodes by linking wireless mobile stations such as computers to a network. The AUTHs 306 can generally perform authentication operations to associate stations. In an example, the AUTHs 306 connect users to other users, and may serve as a point of connection to a wired network. Wireless AUTHs include a radio or some other known or convenient device capable of wireless transmission and/or reception. In a non-limiting embodiment, the radio is configured for 802.11, 3G, Wi-Max, or other standard transmissions. The AUTHs 306 logically stand between the station 310 and the network to authenticate the client's identity and ensure secure communication. The AUTHs 306 can reside in any convenient location on the network, such as on independent "smart" APs, on wireless switches as a part of an infrastructure network, functionally distributed across a plurality of hardware or software devices (e.g., an AP could be coupled to a controller, and together function as an AUTH), or in another known or convenient location.

In the example of FIG. 3, the credential caches 308 can include computer readable storage mediums in the AUTHs 306. Although in the example of FIG. 3, the credential caches are depicted as residing in or on respective AUTHs 306, this is simply a common implementation, not a requirement. The credential caches 308 may be physically located anywhere, and coupled to the AUTHs 306. Of course, it would typically be undesirable to introduce a lag when the AUTHs 306 access the credential caches 308. The credential caches 308 can store copies of the global credential repository 302. The copies can include one or more credentials. The credential caches 308 can be stored in a computer readable medium coupled to a processor. An AUTH, such as one of AUTHs 306, can store master keys and generate transient keys, values derived from keys, or other known or convenient keys or values for use by a station, such as the station 310.

In the example of FIG. 3, the station 310 can include any known or convenient wireless device. It should be noted that the station 310 may or may not be wireless, but for illustrative purposes only, the station 310 is assumed to be a wireless device, such as a cell phone, PDA, laptop, notebook computing device, or any other device that can use 802.11 or other wireless protocols. When the station 310 is associated with and/or authenticated by one of the AUTHs 306, the station 310 can connect to the network. For illustrative purposes in the example of FIG. 3, the station 310 is coupled to the AUTH 306-2.

In the example of FIG. 3, the transient key store 312 includes a computer readable medium. In operation, the transient key store 312 includes a transient key derived from a master key in the global credential repository 302. Typically the transient key is changed from time to time; so that if the transient key is acquired or otherwise compromised, an intruder will not be able to use the transient key. The transient key can be relatively exposed to individuals or devices who might attempt to break the security of the connection between the station 310 and the AUTH 306-2, but the master key (although it can be) is generally not exposed.

In the example of FIG. 3, in operation, the station 310 previously associated with AUTH 306-1. The AUTH 306-1 had requested a master key from the credential creator 304. The credential creator 304 created the master key and provided the master key to the AUTH 306-1, which stored the master key in the credential cache 308-1. The AUTH 306-1 then published the master key as a global credential to the global credential repository 302. The AUTHs 306, including AUTH 306-2 and AUTH 306-n each stored the master key in the credential caches 308. The global credential repository 302 then reflected the new master key. Following publication, the credential caches 308 each reflect the global credential repository 302. The AUTH 306-1 then used the master key to transmit and receive data with the station 310, such as by creating transient keys to secure data transmitted between the AUTH 306-1 and the station 310.

In the example of FIG. 3, in operation, the station 310 roams and associates with AUTH 306-2 as illustrated in the example of FIG. 3 by roaming indicator 322. When associating with AUTH 306-2 the station 310 tries, but, for one reason or another, is unable to associate using the previously generated master key, or other key created using the master key. In order to associate the station 310, the AUTH 306-2 creates or acquires a new master key for the station 310. The new master key is stored in the credential cache 308-2 and published as a global credential for the station 310. The global credential repository 302 reflects the new master key, and the AUTH 306-2 stores the new master key in the credential cache 308-2. The AUTH 306-2 provides a transient key or other known or convenient key or value to the station 310. The transient key store 312 reflects the transient key or value. The station 310 uses the key or value stored in the transient key store 312 transmit and receive data with the AUTH 306-2.

In the example of FIG. 3, in operation, the station 310 then roams back to AUTH 306-1 as illustrated in the example of FIG. 3 by the roaming indicator 324. Having previously associated with the AUTH 306-1, the station 310 may attempt to use the key the station 310 previously used with the AUTH 306-1. The AUTH 306-1 recognizes the key, and associates the station 310. The station 310 is allowed to transmit and receive data. The AUTH 306-1 automatically republishes the previously generated master key to the global credential repository 106. AUTH 306-1 and AUTH 306-2 receive the previously generated master key and store the previously generated master key in the credential cache 308-1 for use in future associations of the station 310.

Figure 4:
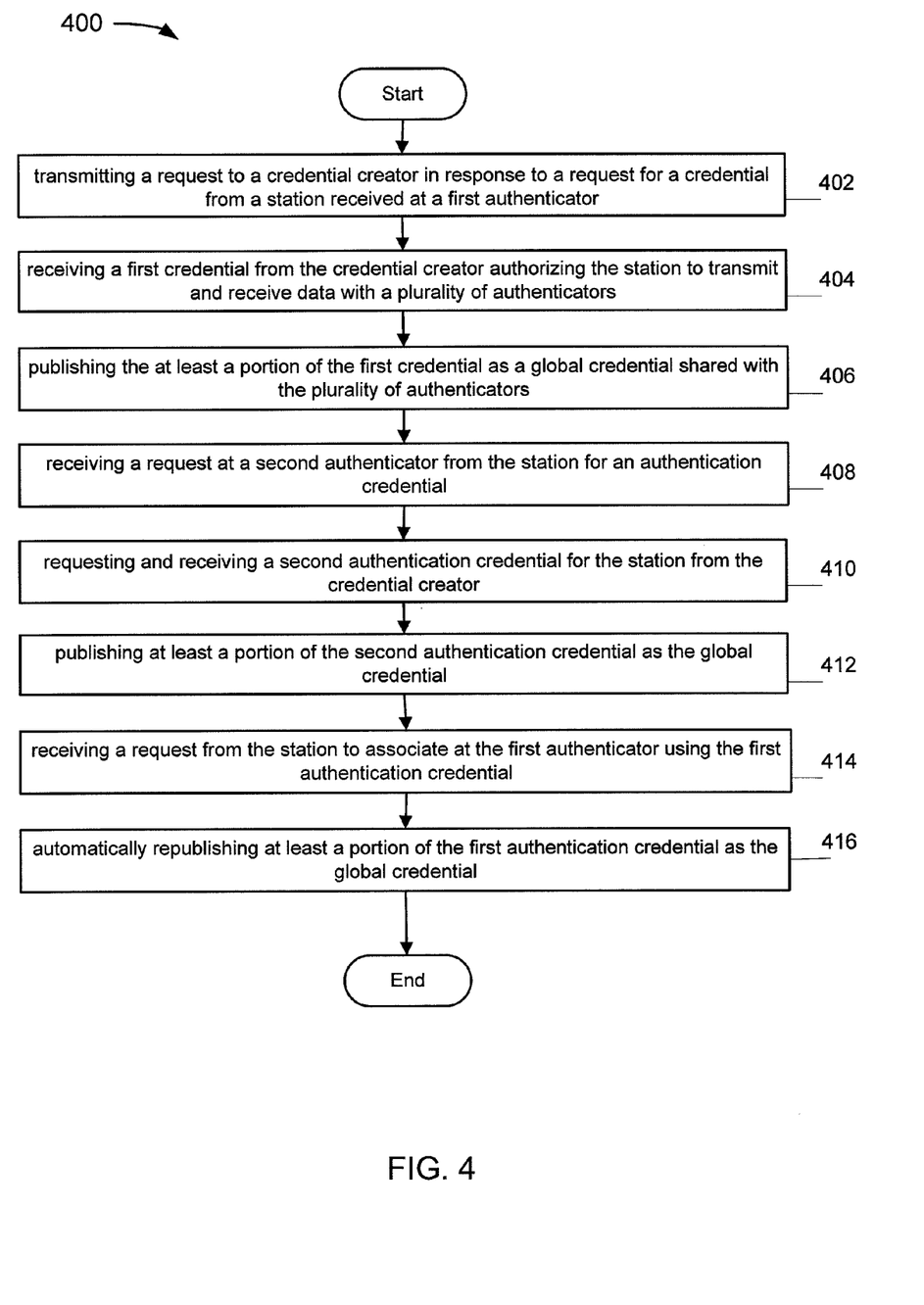
FIG. 4 depicts a flowchart of an example of a method for proactively caching credentials.

FIG. 4 depicts a flowchart 400 of an example of a method for proactively caching credentials. The method is organized as a sequence of modules in the flowchart 400. However, it should be understood that these and other modules associated with other methods described herein may be reordered for parallel execution or into different sequences of modules. One or more of the modules (or portions thereof) may be implemented in a computer readable medium for execution by a computer.

In the example of FIG. 4, the flowchart 400 starts at module 402 with transmitting a request to a credential creator in response to a request for a credential from a station received at a first authenticator. The request for the credential can cause the credential creator to generate a master key. The creation of the master key can be the result of an authentication process. The master key can be used for an extended period of time, for example, an entire session, and could be a SEK. Alternatively, a master key can be pre-configured for the station and the request merely retrieves the master key for the station from the credential creator. The first credential can include this master key. The master key is not typically exposed to network traffic. Instead a transient key, which by way of example and not limitation can be a PTK, can be generated from a master key and changed regularly. A PTK can be the result of a four-way handshake. Any known or convenient method can be used to generate or retrieve such a key. For example, the key can be periodically reset, or remapped with randomly generated numbers to ensure security. The first credential can include this transient key as well.

In the example of FIG. 4, the flowchart 400 continues to module 404 with receiving a first credential from the credential creator authorizing the station to transmit and receive data with a plurality of authenticators. The first credential can include the master key as well as possibly a transient key, hash value generated from a master key, or other known or convenient key or value. This credential can be received, and the station can transmit and receive data with the authenticator it is associated with.

In the example of FIG. 4, the flowchart 400 continues to module 406 with publishing at least a portion of the first credential as a global credential shared with the plurality of authenticators. As a global credential, the plurality of authenticators can each store and use the first credential to transmit and receive data with the station. Additionally, the station can roam to other authenticators on the wireless network and use the first credential to associate and transmit and receive data.

In the example of FIG. 4, the flowchart 400 continues to module 408 with receiving a request at a second authenticator from the station for an authentication credential. At times, a station can fail to use an existing global credential to associate with an authenticator. In this case, the station can re-authenticate and have a second credential created. The second credential can be used by the station to transmit and receive data with the second authenticator.

In the example of FIG. 4, the flowchart 400 continues to module 410 with requesting and receiving a second authentication credential for the station from the credential creator. The credential creator can create a new SEK or PMK and can create a PTK. The second credential can include such keys as well as any other known or convenient keys used to transmit and receive data with the station.

In the example of FIG. 4, the flowchart 400 continues to module 412 with publishing at least a portion of the second authentication credential as the global credential. The second authentication credential can be published to the plurality of authenticators and used to associate the station as the station roams about the network. The global credential can be locally cached in each of the authenticators.

In the example of FIG. 4, the flowchart 400 continues to module 414 with receiving a request from the station to associate at the first authenticator using the first authentication credential. Here, the station has roamed back to the first authenticator, and can use the first authentication credential. The first authenticator can store the second global credential as well as the first credential. As such the first authenticator can associate the station using the first credential.

In the example of FIG. 4, the flowchart 400 continues to module 416 with automatically republishing at least a portion of the first authentication credential as the global credential. As the station has used the first authentication credential to associate with the station, the station can automatically republish the first credential to the plurality of authenticators. The plurality of authenticators can use the first credential to transmit and receive data with the station. Having automatically republished the first authentication credential, the flowchart 400 terminates.

Figure 5:
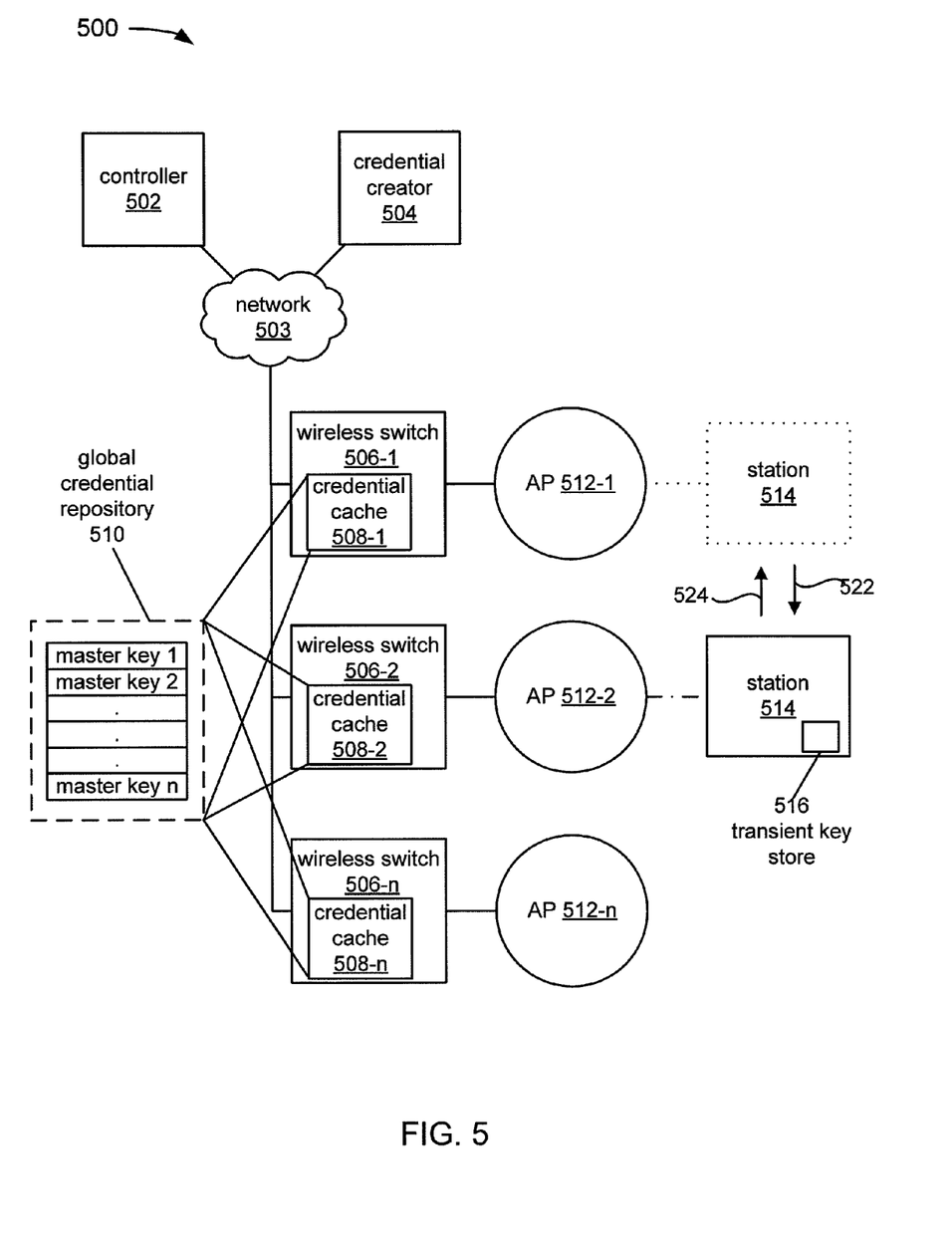
FIG. 5 depicts an infrastructure network of APs proactively caching credentials on behalf of a station.

FIG. 5 depicts an infrastructure network 500 of APs proactively caching credentials on behalf of a station. FIG. 5 includes controller 502, network 503, credential creator 504, wireless switch 506-1, wireless switch 506-2, wireless switch 506-n (collectively wireless switches 506), domain cache 510, AP 512-1, AP 512-2, AP 512-n (collectively APs 512), and station 514.

In the example of FIG. 5, the controller 502 can be practically any type of device that is capable of communicating with a communications network, such as, by way of example but not limitation, a mainframe or a workstation. In a non-limiting example, the controller 502 is connected to a backbone network (not shown), either directly or indirectly through a wireless network. The controller 502 can include, by way of example but not limitation, a Lightweight Directory Access Protocol (LDAP) server, a policy server, a combination of these servers, or another known or convenient server.

In the example of FIG. 5, the network 503 can be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 5, the credential creator 504 can be any computing system operable to create and provide credential for use by a station on a network. In a non-limiting example, the credential creator 504 can include a Remote Authentication Dial In User Services (RADIUS) server.

In the example of FIG. 5, the wireless switches 506 are devices, such as specific purpose computing devices coupled together by a wired backbone. The wireless switches 506 can swap data and client information including authentication and authorization attributes and information. The wireless switches 506 can provide forwarding, queuing, tunneling, and/or some security services for the information the wireless switches 506 receive from APs 512. The wireless switches 506 can coordinate, provide power to, and/or manage the configuration of the APs 512. In a non-limiting example, the wireless switches are Trapeze Networks Mobility Exchange® Switches, available from Trapeze Networks, Inc., of Pleasanton, Calif.

In the example of FIG. 5, the wireless exchange switches include the credential caches 508. The credential caches 508 include master keys associated with station; in a non-limiting example, a master key is associated with the station 514 and stored in the credential caches 508. Copies of the keys in the global credential repository 510 are also reflected by copies in the credential caches 508. The credential cache could also be located on the APs 512, in the controller 502, or in any other convenient location.

In the example of FIG. 5, the global credential repository 510 includes keys that are paired with stations. For each station, the global credential repository 510 can include a master key which by way of example and not limitation can be a PMK or a SEK, and may include a transient key such as a PTK. The pairing can be, by way of example and not limitation, a relationship between the MAC (media access control) address and the key(s). Stations can be associated with APs using the keys. For example, the station 514 is associated with the AP 512-2 and the wireless switch 506-2 using a key stored in the global credential repository 510 and the credential caches 508.

In the example of FIG. 5, the APs 512 are hardware units that each act as a communication hub by linking wireless mobile stations such as personal computing devices (PCs) to a wired backbone network. The APs 512 can connect users to other users within the network and can serve as the point of interconnection between a wireless local area network (WLAN) and a wired network. The number of users and size of a network help to determine how many APs are desirable for a given implementation. In a non-limiting example, an AP, can include a Trapeze Networks Mobility System® Mobility Point® (MP®) AP, such as is available from Trapeze Networks of Pleasanton, Calif.

In the example of FIG. 5, the station 514 can be any wireless device. It should be noted that the station 514 may or may not be wireless, but for illustrative purposes only, the station 514 is assumed to be a wireless device, such as by way of example but not limitation, a cell phone, PDA (personal digital assistant), laptop, notebook computing device, or any other device that can use 802.11 or other wireless protocols. When the station 514 is associated with one of the APs 512, the station 514 can communicate with the network. For illustrative purposes, the station 514 is associated with the AP 512-2.

In the example of FIG. 5, the transient key store 516 can include a PTK, value generated from a master key, the master key itself, or any known or convenient key or value used to encrypt messages transmitted between the station 514 and the APs 512. In a non-limiting example, the transient key store 516 can include a key or value that is the result of a four-way handshake that is used to establish the transient key store 516 as a PTK. Any known or convenient method can be used to generate or retrieve such a key.

In the example of FIG. 5, the roaming indicator 522 indicates that the station 514 has roamed from the AP 512-1 to the AP 512-2 and the roaming indicator 524 indicates that the station has roamed from the AP 512-2 back to the AP 512-1.

In the example of FIG. 5, in operation, the station 514 was previously associated with AP 512-1. The AP 512-1 had requested a master key from the credential creator 504. The credential creator 504 created the master key and provided the master key to the AP 512-1, which stored the master key in the credential cache 508-1. The AP 512-1 then published the master key as a global credential to the global credential repository 510. The APs 512, including AP 512-2 and AP 512-1 each stored the master key in the credential caches 508. The global credential repository 510 then reflected the new master key. Following publication, the credential caches 508 each reflect the global credential repository 510. The AP 512-1 then uses the master key to transmit and receive data with the station 514, such as by creating transient keys, values or other known or convenient keys or values, stored in the transient key store 516 to secure data transmitted between the AP 512-1 and the station 514.

In the example of FIG. 5, in operation, the station 514 then roams and associates with AP 512-2 as currently depicted in FIG. 5 by roaming indicator 522. When associating with AP 506-2 the station 514 tries, but is unable to associate using the previously generated master key, or other key created using the master key. In order to associate the station 514, the AP 512-2 creates or acquires a new master key for the station 514. The new master key is stored in the credential cache 508-2 and published. The global credential repository 510 reflects the new master key, and the AP 512-2 stores the new master key in the credential cache 508-2. The station 514 uses the new master key or other credential created from the master key to transmit and receive data with the AP 512-2.

In the example of FIG. 5, in operation, the station 514 then roams back to AP 512-1 as indicated by the roaming indicator 524. Having previously associated with the AP 512-1, the station 514 may attempt to use the key the station 514 previously used with the AP 512-1. The AP 512-1 recognizes the key, and associates the station 514, and automatically republishes the previously generated master key to the global credential repository 510. The APs 512 receive the previously generated master key and stores it in the credential caches 508 for use in future associations of the station 514.

Figure 6:
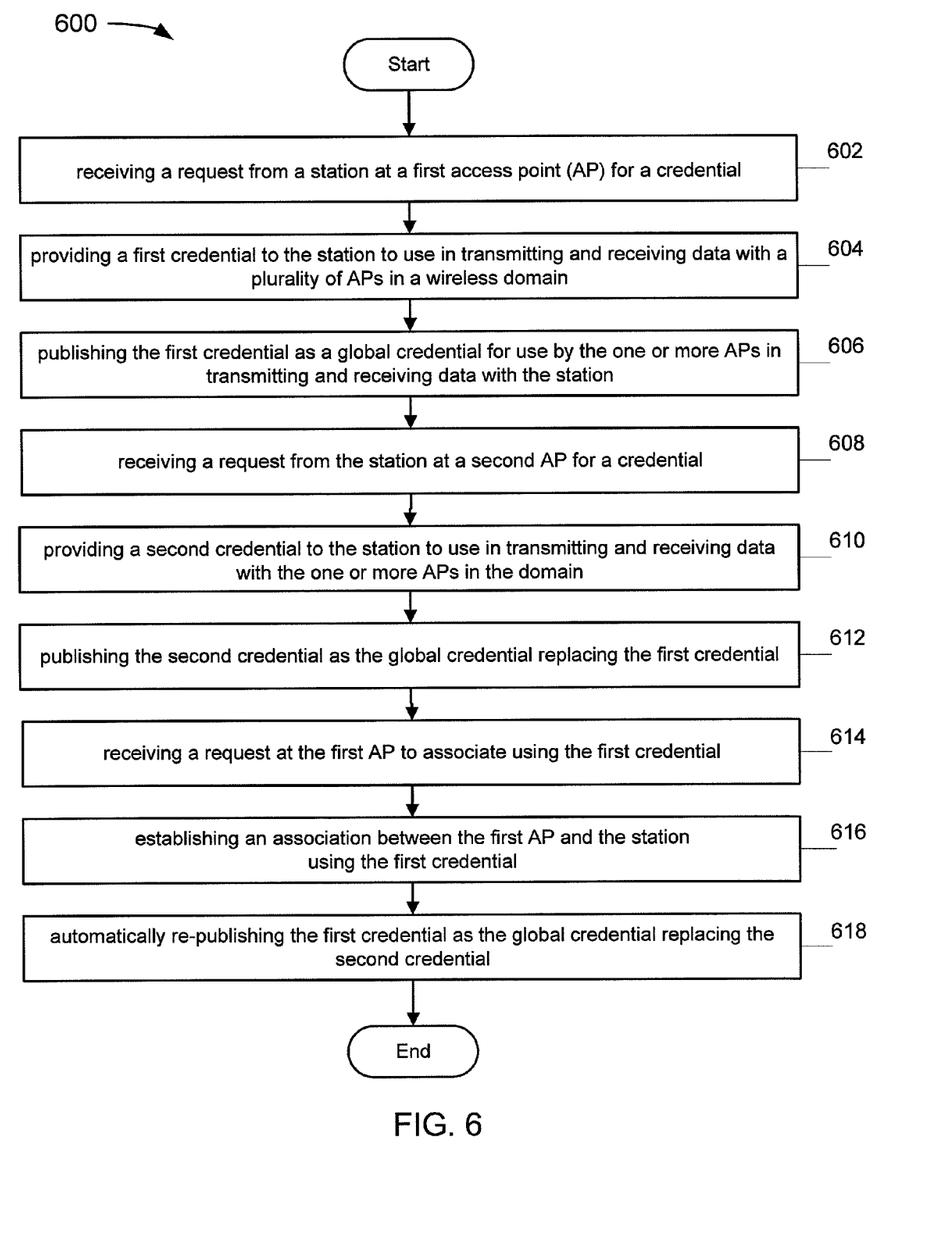
FIG. 6 depicts a flowchart of an example of a method for proactively caching credentials.

FIG. 6 depicts a flowchart 600 of an example of a method for proactively caching credentials. The method is organized as a sequence of modules in the flowchart 600. However, it should be understood that these and other modules associated with other methods described herein may be reordered for parallel execution or into different sequences of modules.

In the example of FIG. 6, the flowchart starts at module 602 with receiving a request from a station at a first AP for a credential. The station can seek authentication resulting in the creation of a key for use by the station in transmitting and receiving data with the AP. In a non-limiting example, the credential can include a PMK, a SEK, and/or a PTK.

In the example of FIG. 6, the flowchart 600 continues to module 604 with providing a first credential to the station to use in transmitting and receiving data with a plurality of APs in a wireless domain. The first credential can be created by a credential creator, and stored in a global credential repository. The first credential or a portion of the first credential can be provided to the station for use in transmitting and receiving data with the APs. In a non-limiting example, the credential can include a PMK and a PTK, and the PTK can be provided to the station for use in transmitting and receiving data.

In the example of FIG. 6, the flowchart 600 continues to module 606 with publishing the first credential as a global credential for use by the one or more APs in transmitting and receiving data with the station. The global credential can be locally cached in one or more locations for use by APs in transmitting and receiving data with a station. A plurality of APs on a network can use the global credential to encrypt messages transmitted and received with the station.

In the example of FIG. 6, the flowchart 600 continues to module 608 with receiving a request from the station at a second AP for a credential. The station may have unsuccessfully attempted to associate with the second AP using the first credential. As a result, the station can then request a new credential so that the station can transmit and receive data with the second AP.

In the example of FIG. 6, the flowchart 600 continues to module 610 with providing a second credential to the station to use in transmitting and receiving data with the one or more APs in the domain. The second credential can be created by a credential creator and provided to the station.

In the example of FIG. 6, the flowchart 600 continues to module 612 with publishing the second credential as the global credential replacing the first credential. The second credential can be stored in a global credential repository. APs having access to the global credential repository can use the second credential to transmit and receive data with the station.

In the example of FIG. 6, the flowchart 600 continues to module 614 with receiving a request at the first AP to associate using the first credential. The station can roam back to the first AP and attempt to associate. The first AP can identify the station as having previously associated with the AP, or otherwise relate the first credential to the station.

In the example of FIG. 6, the flowchart 600 continues to module 616 with establishing an association between the first AP and the station using the first credential. The AP, in recognizing the station, can admit the station using the first credential, even though the station is associated with the second credential in the global credential repository.

In the example of FIG. 6, the flowchart 600 continues to module 618 with automatically republishing the first credential as the global credential replacing the second credential. As the station has begun using the first credential, the APs can also automatically use the first credential to associate the station as it roams. Advantageously, the station is quickly handed off while roaming from AP to AP. Having automatically republished the first credential, the flowchart terminates.

Figure 7:
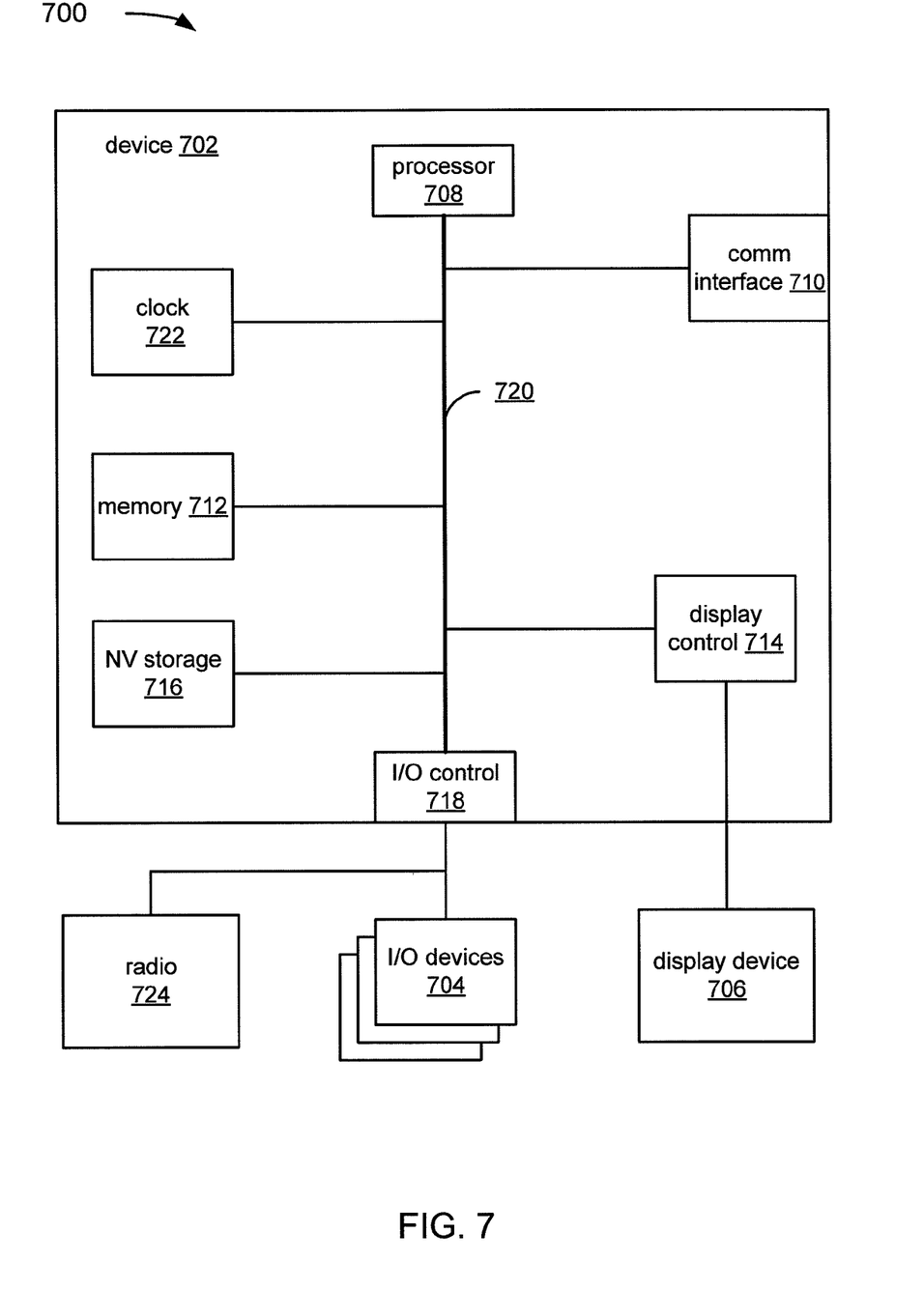
FIG. 7 depicts an example of a system that is representative of computing systems discussed herein.

FIG. 7 depicts an example of a system 700 that is representative of the computing systems discussed herein. The system 700 may be a conventional computer system that can be used as a client computer system, such as a wireless client or a workstation, or a server computer system. The system 700 includes a device 702, I/O devices 704, and a display device 706. The device 702 includes a processor 708, a communications interface 710, memory 712, display controller 714, non-volatile storage 716, I/O controller 718, clock 722, and radio 724. The device 702 may be coupled to or include the I/O devices 704 and the display device 706.

The device 702 can interface with external systems through the communications interface 710, which may include a modem or network interface. It will be appreciated that the communications interface 710 can be considered to be part of the system 700 or a part of the device 702. The communications interface 710 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 708 may be, for example, a conventional microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the memory 712, also to the non-volatile storage 716, to the display controller 714, and to the I/O controller 718.

The I/O devices 704 can include a keyboard, disk drives, printers, a scanner, and other input and output devices, including a mouse or other pointing device. The display controller 714 may control in the conventional manner a display on the display device 706, which can be, for example, a cathode ray tube (CRT) or liquid crystal display (LCD). The display controller 714 and the I/O controller 718 can be implemented with conventional well known technology.

The non-volatile storage 716 is often a magnetic hard disk, flash memory, an optical disk, or another form of storage for large amounts of data. Some of this data is often written, by a direct memory access process, into memory 712 during execution of software in the device 702. One of skill in the art will immediately recognize that the terms "machine-readable medium" or "computer-readable medium" includes any type of storage device that is accessible by the processor 708.

Clock 722 can be any kind of oscillating circuit creating an electrical signal with a precise frequency. In a non-limiting example, clock 722 could be a crystal oscillator using the mechanical resonance of vibrating crystal to generate the electrical signal.

The radio 724 can include any combination of electronic components, for example, transistors, resistors and capacitors. The radio is operable to transmit and/or receive signals.

The system 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it may lack some of the features shown in FIG. 7, such as certain input or output devices. A typical computer system will usually include at least a processor, memory, and a bus coupling the memory to the processor.

In addition, the system 700 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 716 and causes the processor 708 to execute the various acts required by the operating system to input and output data and to store data in memory, including storing files on the non-volatile storage 716.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. A method, performed by one or more devices, the method comprising:
  publishing, by the one or more devices and in a memory storing credentials associated with a plurality of stations that access a network, at least a portion of a first credential as a global credential, the first credential being used by a plurality of access nodes in connecting a particular station, of the plurality of stations, to the network;

publishing, by the one or more devices, at least a portion of a second credential as the global credential, the second credential being used by the plurality of access nodes in connecting the particular station to the network, the second credential being different than the first credential;

receiving, at the one or more devices, a request from the particular station to re-connect to the network using the first credential; and automatically overwriting, by the one or more devices and based on receiving the request to re-connect to the network using the first credential, the second credential with the first credential, the first credential being used by the plurality of access nodes in connecting the particular station to the network.

2. The method of claim 1, where the first credential includes a pair-wise master key (PMK).

3. The method of claim 1, further comprising:

transmitting a transient key associated with the first credential to a first access node of the plurality of access nodes; and identifying, by the first access node, a master key associated with the transient key.

4. The method of claim 1, further comprising republishing the first credential to the plurality of access nodes.

5. The method of claim 1, further comprising storing the first credential as one or more copies on one or more wireless switches coupling the plurality of access nodes.

6. The method of claim 1, further comprising storing a copy of the global credential in each access node of the plurality of access nodes.

7. A system comprising:

a first device, associated with a network, and a memory, the memory storing credentials associated with a plurality of stations that access the network, the first device to:

connect a station, of the plurality of stations, with the network using a first credential, publish, based on connecting the station with the network, at least a portion of the first credential to the memory, and exchange, using the first credential, data with the station; and a second device, associated with the network and the memory, the second device to:

attempt to connect the station to the network using the first credential, connect the station to the network using a second credential when the second device is unable to connect the station to the network using the first credential, and publish the second credential to the memory based on connecting the station to the network using the second credential;

the first device being further to:

receive a request from the station to connect to the network using the first credential after the second device publishes the second credential to the memory, connect, based on receiving the request to connect to the network using the first credential, the station to the network using the first credential, and automatically republish, based on connecting the station to the network using the first credential, the first credential to the memory by overwriting the second credential with the first credential.

8. The system of claim 7, where the memory includes a cache.

9. The system of claim 7, where a first copy of the credentials associated with the plurality of stations is stored on a first wireless switch connected to the first device and a second copy of the credentials associated with a plurality of stations is stored on a second wireless switch connected to the second device.

10. The system of claim 7, where at least one of the first credential or the second credential includes a pair-wise master key (PMK).

11. A method comprising:

receiving, at a first device and from a station, a first request for a first authentication credential;

transmitting, by the first device and to a credential creator, a second request for the first authentication credential based on the first request from the station;

receiving, at the first device, the first authentication credential, from the credential creator, the first authentication credential authorizing the station to transmit and receive data with a plurality of devices;

publishing, by the first device and to a credential cache, at least a portion of the first authentication credential as a global authentication credential shared with the plurality of devices;

receiving, at a second device and from the station, a third request for a second authentication credential;

transmitting, by the second device and to the credential creator and based on receiving the third request, a fourth request for the second authentication credential;

receiving, at the second device and from the credential creator, the second authentication credential;

publishing, by the second device and to the credential cache, at least a portion of the second authentication credential as the global authentication credential;

receiving, at the first device, a request from the station to connect to a network using the first authentication credential; and automatically republishing, by the first device and to the credential cache, at least a portion of the first authentication credential as the global credential by overwriting the second authentication credential with the first authentication credential.

12. The method of claim 11, where the credential creator is coupled to the first device and the second device and where, when a credential is created, the credential creator transmits the credential to each of the first device and the second device.

13. The method of claim 11, where the first device and the second device each store a copy of the information stored in the credential cache.

14. The method of claim 11, where the first authentication credential includes a pair-wise master key (PMK).

15. The method of claim 11, where automatically republishing the at least a portion of the first authentication credential includes automatically republishing a PMK associated with the first authentication credential.

16. The method of claim 11, further comprising:

transmitting, from the first device to the second device, changes to the credential cache; and storing the changes in a copy of the credential cache stored at the second device.

* * * * *